United States Patent [19]

Hansen

[11] Patent Number: 5,035,227
[45] Date of Patent: Jul. 30, 1991

[54] VAPORIZER FOR INTERNAL COMBUSTION STEAM ENGINE

[76] Inventor: Herbert N. W. Hansen, 432 Wing Park Blvd., Elgin, Ill. 60120

[21] Appl. No.: 474,559

[22] Filed: Feb. 2, 1990

[51] Int. Cl.$^5$ ............................................. F02M 33/00
[52] U.S. Cl. ..................................... 123/557; 123/1 A
[58] Field of Search .................. 123/557, 522, 1 A, 3, 123/547

[56] References Cited

U.S. PATENT DOCUMENTS

| | | | |
|---|---|---|---|
| 3,530,842 | 9/1970 | von Brimer | 123/522 |
| 4,151,821 | 5/1979 | Wichman et al. | 123/557 |
| 4,385,593 | 5/1983 | Brooks | 123/1 A |
| 4,509,464 | 4/1985 | Hansen | 123/1 A |
| 4,510,913 | 4/1985 | deCelle | 123/557 |
| 4,519,341 | 5/1985 | McGarr | 123/1 A |
| 4,635,608 | 1/1987 | Carroll | 123/1 A |

Primary Examiner—Andrew M. Dolinar
Assistant Examiner—M. Macy
Attorney, Agent, or Firm—R. Winston Slater

[57] ABSTRACT

An alcohol/water fuel vaporizer for use in an internal combustion steam engine. The vaporizer comprises an exhaust gas chamber through which engine exhaust is passed and a vapor chamber for the generation and retention of pressurized fuel vapor. The exhaust gas chamber includes a plurality of baffles to direct the flow of the gas against a crown sheet, the latter sheet being heated thereby. The crown sheet forms the dividing partition between the vapor and exhaust gas chambers. A fuel preheater is positioned in the vapor chamber through which engine coolant is passed. A plurality of switchable fuel injectors in the vapor chamber controllably admit and spray fuel onto the preheater and crown plate in response to engine power demands and vapor chamber pressure.

7 Claims, 1 Drawing Sheet

VAPORIZER FOR INTERNAL COMBUSTION STEAM ENGINE

BACKGROUND OF THE INVENTION

The present invention relates generally to an internal combustion steam engine that operates with an alcohol fuel and, in particular, to an alcohol/water fuel system for supplying a vaporized fuel to the engine. Upon combustion, superheated steam is generated within the cylinders to produce an elevated pressure and temperature. More specifically, the present invention pertains to a unique combination of internal combustion and external burner steam technologies particularly adapted for recirculation of heat energy to produce a highly efficient engine adapted for automotive, farm, and other uses.

The present invention is further directed to an improved vaporizer for use in connection with the above-described water/alcohol internal combustion steam engine. Such an engine was fully described in the prior U.S. Pat. No. 4,509,464 to the present inventor, Hansen. Therefore, the construction and operation of the engine itself will not be considered in detail herein except as it relates to the implementation of the present vaporizer.

Indeed, the earlier '464 Hansen patent relates to improved vaporizer technology, specifically, to a dual-chamber vaporizer construction adapted to minimize the adverse effects of fractional distillation. The vaporizer of the '464 patent has been found to perform satisfactorily for alcohol/water fuels down to about 90 proof, particularly where the fuel is of substantially pure quality, that is, uncontaminated by foreign solutes. In this connection, as water and alcohol are both excellent solvents, keeping the fuel free of solutes has proved to be a problem of non-trivial proportion.

This problem of solutes or fuel contamination has been found to be of substantial importance in connection with the commercial exploitation of internal combustion steam technology. Although high purity alcohol fuels are readily available, the cost of these fuels can range from twice to as much as ten times that of fuels produced under less exacting and controlled conditions.

The impact of the solutes problem is further accentuated when it is realized that many of the potential users of the alcohol-based internal combustion steam engine, e.g. farmers, are persons who have ample access to the recyclable waste or home-produced agricultural base stock from which alcohol may be produced. Such consumers, therefore, can be expected to manufacture fuel for their consumption as well as others in their locale. Fuels from such indigenous and varied sources characteristically contain higher impurity concentrations.

Even where uncontaminated fuel is available, the problems of fractional distillation again surface when operating with fuels of super-low proofage, i.e. generally below about 90 proof. For such fuels, the residual affinity of the alcohol molecules (for water) is insufficient 'to bring' or capture the increasingly greater proportion of water molecules as the alcohol is vaporized. This problem is particularly acute at lower vaporizer temperatures which, as noted below, have been found to track reductions in alcohol concentrations.

It will be appreciated, therefore, that the improvements in vaporizer technology described herein are directed, first, to minimizing or totally eliminating the problems associated with fuel impurities and, second, to permitting the use of alcohol-based fuels of yet lower alcohol concentrations, for example 80 proof.

Importantly, and directly associated with obtaining this latter objective, the present invention results in yet another improvement in the overall efficiency of the internal combustion steam engine. Efficiencies of approximately 60 percent are now obtainable which, in turn, result in typical fuel economies of between 20 and 40 miles per gallon of 80 proof alcohol-based fuel—such fuel being obtainable for as little as ten cents per gallon.

The internal combustion steam engine described in the Hansen '464 patent requires no radiator as the waste heat collected in the engine's liquid cooling system is routed to the fuel vaporizer where it is converted into useful energy in the processes of vaporizing the alcohol based fuel. In this manner, one significant source of engine inefficiency, the dissipation of engine heat by the radiator, has been largely eliminated.

The Hansen '464 engine also reduced a second major source of engine inefficiency by converting the otherwise wasted exhaust gas heat energy into useful work by preheating the incoming carburetor combustion air.

As noted, certain difficulties were experienced with the engine configuration of Hansen '464 as the proofage of the fuel was reduced, that is, as the ratio of water to alcohol was increased. More specifically, it has been found that the amount of waste engine heat available in the cooling system generally decreases as the fuel proofage is reduced.

Coupled with this reduced waste heat generation is the counterproductive requirement that the fuel itself requires more heat energy to vaporize at these higher water concentrations—this by reason that water requires more energy per pound to vaporize than, for example, ethanol. Thus, even with the improved two-chamber vaporizer described in Hansen '464, fractional distillation was again found to be a problem for alcohol fuels of very low proofage.

With respect to the second source of waste engine heat discussed above, it was discovered that the exhaust gas heat energy actually increases as the fuel proofage is lowered due, principally, to the increased steam content of the engine exhaust. The available exhaust gas heat energy significantly exceeds the combustion air preheat requirement.

Unlike the vaporizer of Hansen '464, the present vaporizer has been substantially reconfigured to facilitate collection and conversion of waste heat energy from both the engine coolant and exhaust systems. In this manner the unused exhaust heat energy is meaningfully recycled thereby correcting inadequacies in vaporizer operation at lower proofages while, importantly, raising the overall efficiency of engine operation.

The vaporizer preferably defines a generally enclosed rectangular volume having a form-factor adapted to fit into, and replace, the radiator of a conventional internal combustion gas engine. More specifically, the vaporizer comprises respective air-tight 'exhaust gas' and 'vapor' compartments and chambers vertically separated by a 'crown sheet' barrier. The lower or exhaust gas chamber has inlet/outlet ports at opposed ends thereof and interior baffles whereby the flow of exhaust gas is routed through this lower chamber in proximity to the crown sheet—such sheet defining a shared common wall between the two chambers.

Particularly significant to the performance of the present vaporizer (especially where low proofage and contaminated fuels are used) is its efficacious utilization of the excess exhaust gas energy. These exhaust gases are employed, not merely as a supplemental source of heat energy, but as an energy source at substantially greater temperature, typically between 500°–600° F., than available using the engine coolant approach of Hansen '464.

The vaporizer crown sheet is heated by passage of the exhaust gases to substantially the temperature of the gas itself. As discussed in more detail hereinafter, vaporization is achieved herein by spraying liquid fuel onto the crown sheet which, as noted, has been raised to a temperature several hundred degrees above the vaporization temperature of either water or alcohol (ethanol). It will be appreciated, therefore, that the fuel instantaneously vaporizes upon contacting the crown sheet without regard to the proofage or solutes contained therein.

The upper vaporization region of the Hansen '464 vaporizer, by contrast, receives the engine coolant at its hottest temperature, typically 260° F.—well above the 212° F. vaporization temperature of the hardest-to-vaporize fuel constituent, water. For this reason, the Hansen '464 vaporizer operated well.

Problems with this prior art vaporizer, however, are found where engine operations are attempted with alcohol fuel concentrations below about 90 proof. As previously noted, such operation is associated with a corresponding reduction in the available coolant system heat energy resulting, in turn, in lowered coolant temperatures. As coolant temperatures approach the vaporization temperature of water, fractional distillation is again seen.

The present vaporizer does not, however, sacrifice the efficiency advantages achieved through the recycling of waste engine heat. In conformity with the teachings of Hansen '464, no radiator is employed. Instead, a network of copper tubes defining a fuel preheating heat exchanger is positioned in the vapor chamber above the crown sheet through which the engine coolant is passed. Fuel is sprayed onto this heat exchanger which, in turn, lowers the coolant temperature and heats and/or vaporizes the fuel. The unvaporized fuel thereafter contacts the crown sheet where complete vaporization is assured.

A further advantage of the present vaporizer relates to its ability to handle the wide fuel vaporization demands associated with corresponding engine load changes. It will be appreciated that substantially greater vaporization is required for high vehicle speeds or uphill travel as compared with idle or low speed operations.

Accommodation of these ranging load demands is achieved through the use of a plurality of spray nozzles or injectors in the vapor chamber, each injector being gated-on in response to predetermined vapor chamber pressures. Two injectors have been found to be sufficient for most applications.

Thus, at vapor pressures in excess of about 3.5 psi all fuel spray injectors are off—the engine is operating from the residual volume of pressured fuel vapor in the vapor chamber and from any vapor being generated by the engine coolant heat exchanger. As the vapor pressure drops below about 2.5 psi, the first vapor spray injector is enabled. This injector, be placed in proximity to the hottest region of the crown sheet, ordinarily provides sufficient fuel vapor for continuing normal cruise vehicle operations. In fact, excess vaporization ordinarily will occur with this single injector resulting in the periodic shutting-off of the injector as, again, pressures in excess of 3.5 psi are achieved.

At ever increasing engine/vehicle loads, the proportion of time that the injector is "on" increases until the point is reached where the injector must remain "on" continuously to maintain sufficient operational vapor pressure. Under extreme load conditions, the vapor pressure may continue to decrease, notwithstanding that this first injector remains on continuously, thereby necessitating use of the second or auxiliary spray injector. This injector, like the first injector, is pressure controlled, being enabled when vapor chamber pressures drop below about 1.5 psi.

Advantageously the exhaust heat energy available to the vaporizer increases with increasing engine power loads thereby providing the necessary energy to vaporize the correspondingly increased fuel requirements. Crown plate temperatures remain relatively constant with changing engine loads. As a consequence, highly efficient vaporization is realized under all load conditions.

And yet a further feature of the present vaporizer relates to the highly effective sound muffling characteristics associated with engine combustion. More specifically, the exhaust gas emitted by the present engine, particularly where low proofage fuel is used (e.g. 80 proof) contains a substantial percentage of superheated steam (e.g. 40%) at temperatures of between 500°–600° F. As the exhaust gas passes through the vaporizer, it is significantly cooled—exiting the vaporizer at temperatures around 200° F. This cooling results in significant condensation and a corresponding drop in pressure.

As a consequence, "noise" pressure waves are substantially attenuated as the exhaust transits the vapor chamber thereby eliminating or significantly reducing the need for a separate noise reduction system. And due to the inherently pure, nonpolluting character of the internal combustion steam engine, mufflers and catalytic converters may be entirely avoided.

From the foregoing it will be appreciated that the vaporizer of the present invention exhibits startling improvements in a number of important categories critical to internal combustion steam engine operation. These improvements include full and complete vaporization, i.e. the elimination of fractional distillation, under widely varying engine load conditions and where impure and low proofage fuels are employed; the increase in engine efficiency by more effectively recycling engine waste energies; the elimination or reduction in the requirement for engine muffler systems; and control over the quantity of vapor production under extreme load variations.

DESCRIPTION OF THE PREFERRED EMBODIMENT

Figure 1:
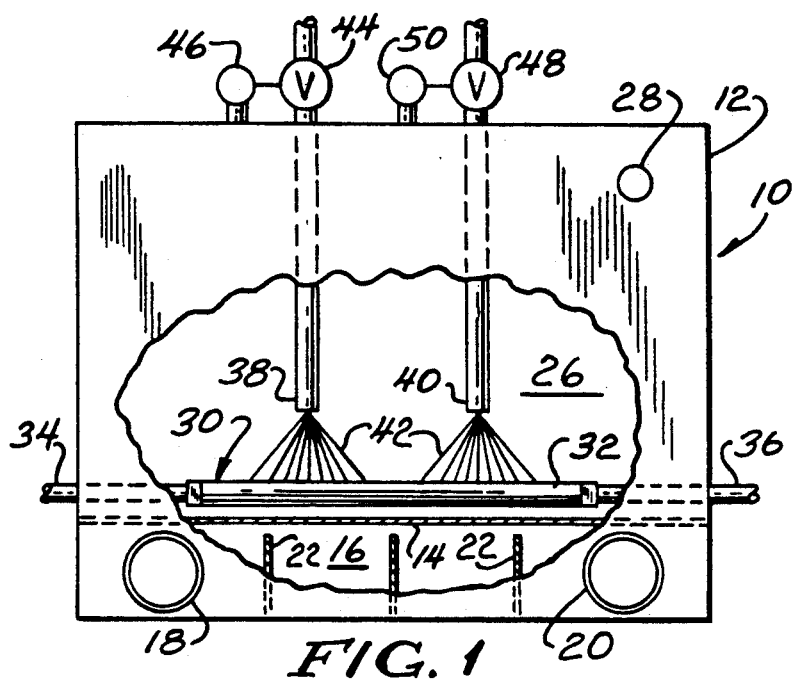
FIG. 1 is a front elevation view of the present vaporizer with portions broken away to reveal interior details thereof.
Figure 2:
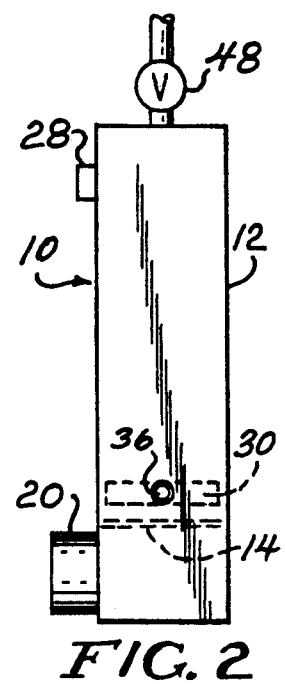
FIG. 2 is a right side elevation view of the vaporizer of FIG. 1.

Referring to FIGS. 1 and 2, the vaporizer 10 of the present invention comprises an outer housing 12 preferably of an overall size configuration to facilitate placement in the engine compartment in the space otherwise generally occupied by the radiator of a conventional automobile.

In this connection it should be understood that the internal combustion steam engine, for example as described by Hansen in U.S. Pat. No. 4,509,464, may advantageously be constructed using conventional internal combustion gas engine blocks and cylinder/piston assemblies or alternatively, simply by converting the fuel, cooling, and exhaust systems of such readily available engines. Thus, the engine technology of the present application, and in particular the vaporizer described herein, finds significant if not principal application in the conversion of existing gas engine vehicles.

It is for this reason that the present vaporizer 10 is preferably configured in size to replace conventional radiators. It will be understood, however, that alternative vaporizer configurations are contemplated.

Referring again to FIGS. 1 and 2, housing 12 defines a pair of pressure-tight chambers separated by, and sharing a common dividing wall, referred to herein as crown sheet 14. The lower or exhaust gas chamber 16 extends along the full bottom width of the vaporizer and has an exhaust gas inlet 18 and outlet 20 spaced at respective opposed ends thereof. Engine exhaust is routed through the carburetor (not shown) to heat the incoming combustion air (as described in Hansen '464), thereafter to vaporizer inlet 18, through chamber 16 and outlet 18, in turn, being expelled to the ambient air through a conventional exhaust pipe (not shown).

More than sufficient energy is available from the engine exhaust, even after heating the incoming combustion air, to aid in the proper vaporization of the alcohol-based fuel. This is particularly true in connection with engines operated from low proofage alcohol fuels, e.g. below about 90 proof, where the superheated steam content of the exhaust, with its corresponding latent heat energy, is high. Indeed, exhaust gas temperatures at the inlet 18 of the vaporizer are typically in the order of between 500° and 600° F.

One or more baffles 22 are placed transversely across the exhaust gas chamber to create exhaust gas turbulence and to force the exhaust gas into proximity with the crown sheet 14 (transverse being defined relative to the path of exhaust gas flow therein, i.e. transverse to the path from inlet 18 to outlet 20). The baffles defines apertures 24 along the upper ends thereof forcing the exhaust gas to transit through the chamber in close proximity to the crown sheet. In this manner the proper transfer of heat energy from the exhaust gas to the crown sheet may be assured.

In one embodiment of the vaporizer the exhaust chamber is approximately 22" in length, 2" in height, and 4" in width, with respective exhaust gas inlets/outlets 16,18 spaced approximately 16" apart. The baffle apertures 24 are ¼" high and, as noted, extend along the entire chamber width.

Due to this close association or passage of the exhaust gas to the crown sheet, the crown sheet is heated substantially to the temperature of the exhaust gas, that is, to about 500°-600° F. in the region of inlet 18. As the exhaust passes through chamber 16, however, heat energy is extracted from the exhaust gas, being absorbed by the crown sheet, thereby resulting in the lowering of the exhaust gas temperature as it passes through this chamber. Exhaust gas temperatures as low as 200° F. may be seen at outlet 18. The temperature of the crown sheet 14 exhibits a corresponding decrease in temperature along its length.

Figure 3:
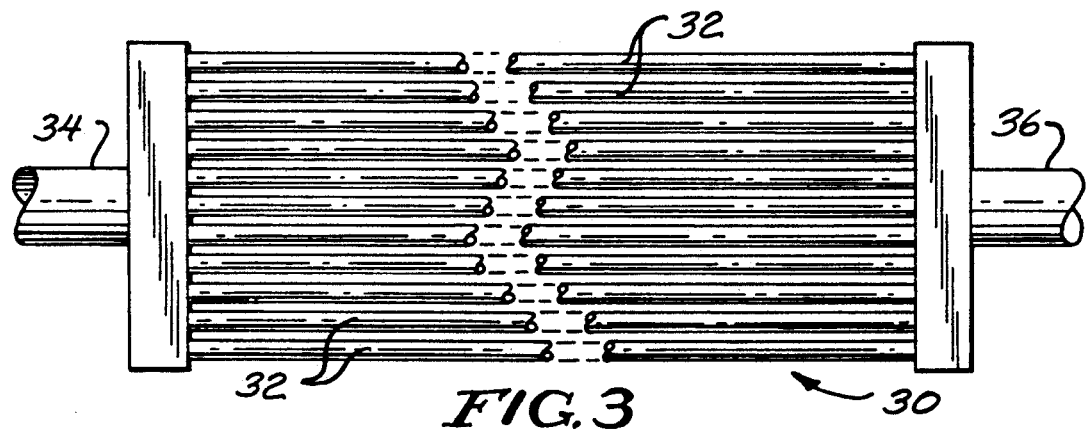
FIG. 3 is a top plan view of the fuel preheater of the present vaporizer.

The interior of outer vaporizer housing 12 above the crown sheet defines a vapor chamber 26. Vaporized alcohol/water fuel is maintained, as set forth hereinafter, at a pressure of between about 1 and 5 psi within the vapor chamber and supplied to the carburetor (not shown) according to the power demands placed on the engine. Vapor chamber outlet 28 interconnects to the vapor fuel inlet of the carburetor As best illustrated in FIG. 3, a fuel preheater 30 is positioned in the lower portion of the vapor chamber generally adjacent to the crown sheet, but spaced therefrom a sufficient distance (i.e. about ⅛ inch) to minimize or preclude conductive heating of the preheater 30 by the exhaust-heated crown sheet.

Preheater 30 includes a plurality of spaced, generally parallel, copper tubes 32 extending lengthwise along the vaporizer, each tube being in fluid communication at its respective distal ends with a cooling fluid inlet 34 and outlet 36. In the fuel preheater illustrated in FIG. 3, copper tubes of ¼" diameter are spaced approximately 1/16" apart across substantially the full 4" vaporizer width.

Coolant from the conventional engine liquid cooling system is routed to vaporizer preheater inlet 34, through the plural copper tubes therein, in turn, returned to the engine through outlet 36. In the preferred arrangement, fuel preheater 30 functions not merely in its fuel preheating capacity, but as a replacement for the conventional engine coolant radiator.

Fuel is introduced into vaporizer 10 through one or more spray nozzles or fuel injectors. It has been found that two injectors are generally sufficient to accommodate the varying loads encountered by most engine-driven vehicles. It will be appreciated, however, that single injector vaporizers, or vaporizers employing more than two injectors are contemplated herein.

Thus, the vaporizer of FIGS. 1 and 2 illustrates the use of two injectors. The first or primary injector 38 is positioned in closest proximity to the exhaust gas inlet 18. In this manner the fuel from this injector is exposed to the hottest regions of both the preheater 30 and crown plate 14 thereby assuring the maximum vaporization effectiveness with respect thereto. A second or auxiliary injector 40 is positioned along the preheater/crown sheet generally adjacent to primary injector 38.

More specifically, both injectors are oriented above preheater 30 such that the respective sprays therefrom define generally circular patterns of about 4" diameter. In this manner fuel is directed across the full corresponding width of preheater 30. Primary injector 38 may be located inwardly from exhaust gas inlet 18 approximately 5" to assure exposure of the fuel therefrom to the hottest regions of the preheater and crown sheet. The auxiliary injector 40 is preferably positioned 6" closer to exhaust gas outlet 20 such that the spray therefrom contacts a virgin region of the preheater/crown sheet, that is, so the respective spray patterns do not overlap.

As best shown in FIG. 1, the spray from the respective injectors 38,40 is directed downwardly against the copper tubes 32 of preheater 30. This spray or fuel mist 42 acts, by reason of its ambient, i.e. intrinsically cool, temperature, to correspondingly lower the temperature of the engine coolant passing through preheater 30—the engine coolant typically entering the preheater at temperatures well-above ambient, often in the order of 250° F. It will be understood that this exchange of otherwise wasted engine heat energy serves, not merely to maintain proper engine operating temperatures, but as a mechanism to raise the temperature of the incoming combustion fuel mixture.

The energy content and absolute temperature of the engine coolant entering the vaporizer may be insufficient to vaporize the required combustion fuel, and to do so without fractional distillation, the latter resulting in excessively rich vapor concentrations followed by the inevitably lean fuel mixtures associated with the premature vaporization of the alcohol constituent. As noted, these difficulties become more debilitating where low proofage or contaminated fuels are used.

The present vaporizer solves this energy shortfall by efficaciously converting excess exhaust gas energy to the vaporization task. This use of a second source of energy is extremely important as, at lower fuel proofages, the margin of available exhaust gas energy, over that required to heat the incoming combustion air, is increasing.

In short, a significant by-product of the internal combustion steam engine would be expelled as waste heat but for the innovations herein disclosed. The tapping of this heretofore unused energy source translates and corresponds directly to improved engine efficiencies—efficiencies which now render the present alcohol-based engine competitive, on a miles per fuel gallon basis, with the higher specific heat (per volume) hydrocarbon fuels, i.e. gasoline.

In addition to this increase in engine efficiency afforded by the present invention is the, possibly more subtle but equally significant, improvement in vaporizer efficacy occasioned by utilization of the exhaust gas energy source—a source available at substantially elevated temperatures, generally in the order between 500°-600° F.

Referring again to FIG. 1, it will be seen that the fuel mist 42 from injectors 38,40 is sprayed either directly onto the crown sheet 14 or indirectly thereon after first contacting and preheater 30. The advantage of this arrangement is that all fuel, regardless of the water concentration or its solute content, immediately flashes into the vapor state upon contact with the superheated crown sheet.

Fuel to each of the injectors 38,40 is independently controlled, i.e. turned "on" or "off", by individual valves that are separately and electrically actuated in response to the sensed pressure within the vapor chamber 26. Specifically, primary valve 44 is positioned in the primary injector 38 fuel supply line and is actuated by switch 46. Switch 46 is mounted to and extends through the vaporizer housing and is responsive to pressure changes within the vapor chamber. Switch 46 is selected to enable valve 44, i.e. to turn-on the spray of fuel from primary injector 38, when the vapor chamber pressure falls below about 2.5 psi and to turn such injector "off" when the pressure therein exceeds about 3.5 psi.

Similarly fuel to the auxiliary injector 40 is controlled by an auxiliary valve 48 and pressure switch 50 combination. The pressure settings of switch 50, however, are set to trigger auxiliary injector operation only when vapor chamber pressures drop below normal operational levels. Thus, the auxiliary injector spray will be triggered should vapor chamber pressures fall below about 1.5 psi and this spray will remain "on" until chamber pressures recover to about 2.5 psi.

Figure 4:
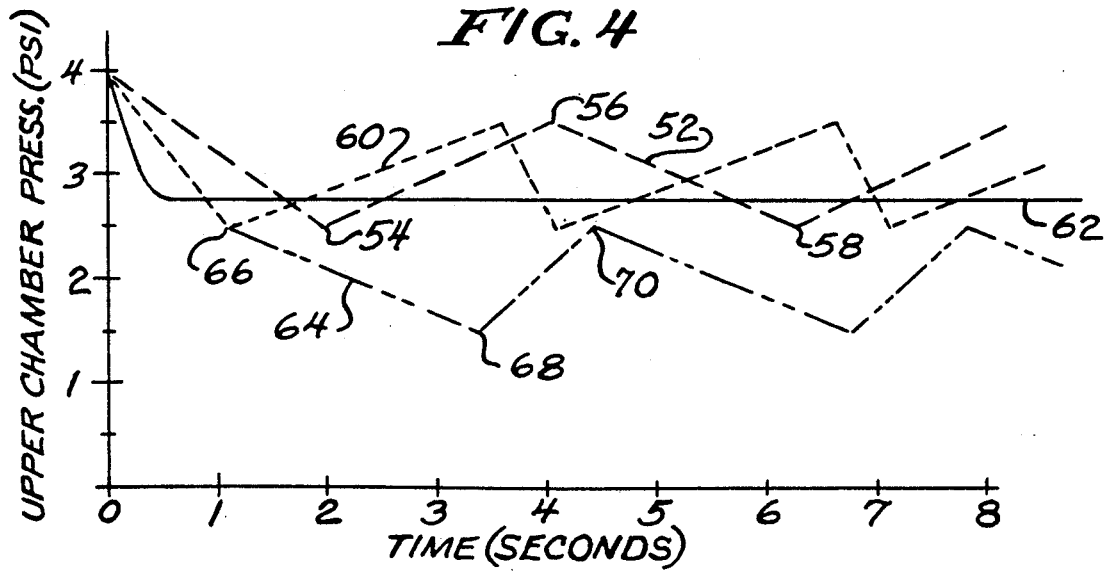
FIG. 4 is a graphic representation of the vapor chamber fuel vapor pressure of the present vaporizer as a function of time for several engine load conditions.

FIG. 4 is illustrative of vaporizer operation, specifically the fuel vapor pressure within the vapor chamber 26, under varying vehicle/engine load conditions. Referring first to the solid trace line 52, there is depicted typical fuel vapor pressures where the vehicle is operated under a "low cruise" condition, that is, at a constant low to moderate speed, on level terrain.

For purposes of illustration, each of the operational curves of FIG. 4 assumes an initial vapor chamber pressure of 4 psi. Such increased chamber pressures would not be unanticipated under certain operating conditions, for example, where the engine has been reduced to idle following a period of higher power operation.

At time "zero", the high vaporizer pressure results in both injectors being disabled, i.e. turned "off", such that no additional fuel is being admitted to the vapor chamber. Under sustained low-cruise power settings (again, as shown by trace 52), the residual vaporized fuel within the vapor chamber is adequate to sustain engine operation for a short duration, e.g. 1-2 seconds, without the introduction of additional fuel into the chamber. The vapor pressure, however, drops steadily until the 2.5 psi trigger threshold, at 54, of the primary pressure switch 46 is reached.

At this instant, fuel from injector 38 is sprayed onto both the preheater 30 and crown sheet 14 in the respective hottest regions thereof. In the case of the crown sheet, temperatures of 500°-600° F. are not uncommon. As a consequence, complete and instantaneous vaporization of that fuel is achieved.

The volume of fuel entering the vaporizer through injector 38, coupled with the heat capacity of the vaporizer, produces more vaporized fuel than is demanded by the engine carburetor (not shown) during low-cruise vehicle operations. Thus, the excess vaporized fuel results in increasing vapor chamber pressures which continue to climb until the 3.5 psi turn-off threshold of switch 46 is reached, shown at 56. At this juncture, the primary injector is switched off and, as no fuel is being injected into the vapor chamber, the vapor pressure declines until the pressure again reaches the 2.5 psi trigger pressure of switch 46, shown at 58. The primary injector 38 is thusly cycled to produce and maintain the required vapor production.

It will be observed that, during operation at the abovedescribed low-cruise power level, vapor chamber pressures remain constantly above the 1.5 psi trigger threshold of the auxiliary injector switch 50 and, consequently, operation at these lower power levels may be sustained without actuation of such auxiliary injector.

The dotted line trace 60 of FIG. 4 similarly illustrates vehicle operation, but under somewhat greater engine power demands, for example, under sustained high-cruise level terrain vehicle travel. Under such conditions, the consumption of fuel vapor increases resulting in the correspondingly sharper negative slope of the depicted vapor pressure curve during periods where fuel injector 38 is off, and, less rapid recoveries of vapor chamber pressuring during injector "on" periods.

It will be understood that by continuing to increase the engine power level, with its corresponding increased fuel vapor requirement, a point of equilibrium may be reached where the production of vaporized fuel from the primary injector 38, alone, is just sufficient to meet engine fuel demands. This condition is shown by line trace 62 of FIG. 4.

If the engine power requirements are increased beyond this level, for example for extreme vehicle speeds, for towing heavy loads, or for steep up-grade travel, fuel vapor production from the single injector 38 may be insufficient. As shown by the line trace 64, vapor chamber pressure, under such extreme load conditions, continues to decrease even following actuation of the primary injector 38 which occurs, shown at 66, when the pressure drops to 2.5 psi. Actuation of the primary injector slows the rate of vapor pressure loss but, as noted, does not arrest its downward trend.

As the vapor chamber pressure continues to drop, the 1.5 psi trigger threshold of auxiliary pressure switch 50 is reached, at 68, which, in turn, enables the corresponding auxiliary injector 40. The vapor generated by these combined injectors is sufficient to provide the vaporized fuel requirements of the engine even when operated under sustained full power conditions. Thus, vapor chamber pressure increases until the 2.5 psi shut-down threshold of the auxiliary switch is reached, at 70. Upon the closing of auxiliary valve 48, chamber pressure again declines. Full or high engine power operations are, therefore maintained in this manner by cycling the auxiliary injector 40 while the primary injector 38 remains continuously enabled.

It will be appreciated that the use of multiple injectors and the use of injectors having fully controllable duty cycles provides a vaporizer having enhanced flexibility to handle the widely varying engine load requirements, from idle to full power. Furthermore, employment of the engine coolant fuel preheater provides an effective means for maintaining proper engine operating temperatures while simultaneously facilitating the recovery of otherwise lost engine heat energy. This energy source, coupled with the incorporation of an exhaust gas chamber, with its high capacity, temperature heat exchange capability, further contributes to the present invention, its improved vaporization consistency in the face of varying quality and proofage fuels, and its complementary attributes contributing to overall high engine fuel efficiencies A further contribution of the present vaporizer pertains to its intrinsic noise attenuating capacity. Passage of the exhaust gas, which gas contains a high content of superheated steam, through the exhaust gas chamber results in the effective attenuation of a large proportion of the ordinary engine combustion noise. Use of the present vaporizer, therefore, obviates the requirement for any further muffling system in most ordinary vehicular applications.

I claim:

1. Alcohol/water fuel vaporizing apparatus for internal combustion steam engines, the engine requiring and operating substantially on vaporized non-hydrocarbon based fuel for combustion and producing heated exhaust gases as a byproduct of such combustion; the fuel vaporizer comprising a first exhaust gas chamber and a second fuel vapor chamber, said respective chambers sharing a common wall therebetween; the exhaust gas chamber having spaced apart exhaust gas inlet and outlet means for channeling engine exhaust gases through said first chamber whereby the passage of the exhaust gases therethrough causes heating of the common wall; vapor outlet means for the passage of vaporized fuel from the vapor chamber; fuel inlet means for admitting unvaporized fuel to the vapor chamber; means for directing the unvaporized fuel from the fuel inlet means against the heated common wall whereby contact of the fuel against the common wall causes the immediate vaporization of the fuel substantially without regard to the impurity or proofage content of the fuel.

2. Alcohol/water fuel vaporizing apparatus for internal combustion steam engines, the engine requiring and operating substantially on vaporized non-hydrocarbon based fuel for combustion and producing heated exhaust gases as a byproduct of such combustion; the fuel vaporizer comprising a first exhaust gas chamber and a second fuel vapor chamber, said respective chambers sharing a common wall therebetween; the exhaust gas chamber having spaced apart exhaust gas inlet and outlet means for channeling engine exhaust gases through said first chamber whereby the passage of the exhaust gases therethrough causes heating of the common wall; vapor outlet means for the passage of vaporized fuel from the vapor chamber; fuel inlet means for admitting unvaporized fuel to the vapor chamber; means for directing the unvaporized fuel from the fuel inlet means against the heated common wall; means for controlling the quantity of unvaporized fuel admitted to the vapor chamber in response to the fuel requirements of the engine whereby contact of the fuel against the common wall causes the immediate vaporization of the fuel substantially without regard to the impurity or proofage content of the fuel.

3. Alcohol/water fuel vaporizing apparatus for internal combustion steam engines, the engine requiring vaporized fuel for combustion and producing heated exhaust gases as a byproduct of such combustion; the fuel vaporizer comprising a first exhaust gas chamber and a second fuel vapor chamber, said respective chambers sharing a common wall therebetween; the exhaust gas chamber having spaced apart exhaust gas inlet and outlet means for channeling engine exhaust gases through said first chamber whereby the passage of the exhaust gases therethrough causes heating of the common wall; vapor outlet means for the passage of vaporized fuel from the vapor chamber; fuel inlet means for admitting unvaporized fuel to the vapor chamber; means for directing the unvaporized fuel from the fuel inlet means against the heated common wall; means for controlling the quantity of unvaporized fuel admitted to the vapor chamber in response to the fuel requirements of the engine, the means for controlling the quantity of unvaporized fuel admitted to the vapor chamber includes a pressure switch operatively coupled to the vapor chamber, said switch actuating in response to a predetermined pressure in the vapor chamber; valve means for selectively restricting the flow of unvaporized fuel into the vapor chamber through the fuel inlet means, the valve means being operatively interconnected to the pressure switch whereby the fuel is admitted to the vapor chamber whenever the pressure in the vapor chamber is less than said predetermined pressure level.

4. Alcohol/water fuel vaporizing apparatus for internal combustion steam engines, the engine requiring vaporized fuel for combustion and producing heated exhaust gases as a byproduct of such combustion; the fuel vaporizer comprising a first exhaust gas chamber and a second fuel vapor chamber, said respective chambers sharing a common wall therebetween; the exhaust gas chamber having spaced apart exhaust gas inlet and outlet means for channeling engine exhaust gases through said first chamber whereby the passage of the exhaust gases therethrough causes heating of the common wall; vapor outlet means for the passage of vaporized fuel from the vapor chamber; fuel inlet means for admitting unvaporized fuel to the vapor chamber; means for directing the unvaporized fuel from the fuel inlet means against the heated common wall; means for controlling the quantity of unvaporized fuel admitted to the vapor chamber in response to the fuel requirements of the engine, the means for controlling the quantity of unvaporized fuel admitted to the vapor chamber includes a pressure switch operatively coupled to the vapor chamber, said switch actuating in response to a predetermined first lower pressure in the vapor chamber and deactuating in response to a predetermined second higher pressure in said chamber; valve means for selectively restricting the flow of unvaporized fuel into the vapor chamber through the fuel inlet means, the valve means being operatively interconnected to the pressure switch whereby the valve means opens to admit fuel whenever the vapor chamber pressure falls below said lower pressure and remains open until the vapor chamber pressure exceeds the second higher pressure.

5. Alcohol/water fuel vaporizing apparatus for internal combustion steam engines, the engine requiring vaporized fuel for combustion and producing heated exhaust gases as a byproduct of such combustion; the fuel vaporizer comprising a first exhaust gas chamber and a second fuel vapor chamber, said respective chambers sharing a common wall therebetween; the exhaust gas chamber having spaced apart exhaust gas inlet and outlet means for channeling engine exhaust gases through said first chamber whereby the passage of the exhaust gases therethrough causes heating of the common wall; vapor outlet means for the passage of vaporized fuel from the vapor chamber; fuel inlet means for admitting unvaporized fuel to the vapor chamber; means for directing the unvaporized fuel from the fuel inlet means against the heated common wall; means for controlling the quantity of unvaporized fuel admitted to the vapor chamber in response to the fuel requirements of the engine, the fuel inlet means includes a plurality of fuel injectors and the means for controlling the quantity of unvaporized fuel admitted to the vapor chamber includes a plurality of pressure switches operatively coupled to the vapor chamber, each of said switches actuating in response to vapor chamber pressure falling below a predetermined pressure level, said pressure level being independently and separately defined for each switch; valve means associated with each of said switches for independently and selectively enabling the flow of unvaporized fuel into the vapor chamber through the respective fuel injectors, each valve means being operatively interconnected to a pressure switch whereby the fuel is admitted to the vapor chamber through successively enabling additional injectors in response to the vapor chamber pressure dropping below corresponding successive predetermined actuation pressure levels whereby more fuel vapor may be generated as required by increasing engine power demands.

6. Alcohol/water fuel vaporizing apparatus for internal combustion steam engines, the engine requiring vaporized fuel for combustion and producing heated exhaust gases as a byproduct of such combustion; the fuel vaporizer comprising a first exhaust gas chamber and a second fuel vapor chamber, said respective chambers sharing a common wall therebetween; the exhaust gas chamber having spaced apart exhaust gas inlet and outlet means for channeling engine exhaust gases through said first chamber whereby the passage of the exhaust gases therethrough causes heating of the common wall; vapor outlet means for the passage of vaporized fuel from the vapor chamber; fuel inlet means for admitting unvaporized fuel to the vapor chamber; means for directing the unvaporized fuel from the fuel inlet means against the heated common wall; means in the exhaust gas chamber for generating turbulent flow of the exhaust gases passing therethrough and for redirecting said gases against the common wall thereby enhancing the thermal exchange of heat energy from the gases to the common wall.

7. Alcohol/water fuel vaporizing apparatus for internal combustion steam engines, the steam engine operative substantially from non-hydrocarbon based fuels and producing heated exhaust gases and a liquid cooling system producing heated engine coolant; the fuel vaporizer comprising a first exhaust gas chamber and a second fuel vapor chamber, the fuel in the second fuel vapor chamber being maintained substantially in the vapor state, said respective chambers sharing a common wall therebetween; the exhaust gas chamber having spaced apart exhaust gas inlet and outlet means for channeling engine exhaust gases through said first chamber whereby the passage of the exhaust gases therethrough causes heating of the common wall; vapor outlet means for the passage of vaporized fuel from the vapor chamber; fuel preheater means in the vapor chamber for preheating engine fuel and for cooling heated engine coolant, the preheater means having an engine coolant inlet and an engine cooling outlet whereby heated engine coolant may be passed therethrough; fuel inlet means for admitting unvaporized fuel to the vapor chamber; means for directing the unvaporized fuel from the fuel inlet means against the fuel preheater means and the heated common wall whereby said unvaporized fuel contacting the preheater causes the transfer of heat energy from the engine coolant into said fuel and whereby contact of the fuel against the common wall causes the immediate vaporization of the fuel substantially without regard to the impurity or proofage content of the fuel.

* * * * *